US011442920B2

(12) United States Patent
Zang et al.

(10) Patent No.: US 11,442,920 B2
(45) Date of Patent: Sep. 13, 2022

(54) GRAPH DATABASE SYSTEM

(71) Applicant: PAYPAL, INC., San Jose, CA (US)

(72) Inventors: Meng Zang, Shanghai (CN); Xin Li, Shanghai (CN); Ying Yue, Shanghai (CN); Lei Wang, Shanghai (CN); Quin Zuo, Cupertino, CA (US); Jun Zhang, Shanghai (CN); Tingjie Jia, Shanghai (CN); Ke Zheng, Shanghai (CN); Junshi Guo, Shanghai (CN); Chaoyi Chen, Shanghai (CN); Qinghai Fu, San Jose, CA (US); Wenbing Zhu, Shanghai (CN); Haoran Zhang, Shanghai (CN); Zhe Huang, Shanghai (CN); Yang Yu, Shanghai (CN); Siddarth Anand, Santa Clara, CA (US); Xiaohan Yun, Palo Alto, CA (US); Mikhail Kourjanski, Oakland, CA (US); Vadim Kutsyy, Los Altos, CA (US); Zhenyin Yang, Saratoga, CA (US)

(73) Assignee: PayPal, Inc., San Jose, CA (US)

( * ) Notice: Subject to any disclaimer, the term of this patent is extended or adjusted under 35 U.S.C. 154(b) by 475 days.

(21) Appl. No.: 16/457,467

(22) Filed: Jun. 28, 2019

(65) Prior Publication Data

US 2020/0409931 A1    Dec. 31, 2020

(51) Int. Cl.
*G06F 16/23* (2019.01)
*G06F 16/901* (2019.01)
*G06F 16/21* (2019.01)
*G06F 11/14* (2006.01)
*G06F 7/14* (2006.01)

(52) U.S. Cl.
CPC ............ *G06F 16/2365* (2019.01); *G06F 7/14* (2013.01); *G06F 11/1469* (2013.01); *G06F 16/212* (2019.01); *G06F 16/9014* (2019.01); *G06F 16/9024* (2019.01); *G06F 2201/84* (2013.01)

(58) Field of Classification Search
None
See application file for complete search history.

(56) References Cited

U.S. PATENT DOCUMENTS

| 10,268,709 | B1 * | 4/2019 | Suehs | G06F 16/211 |
| 2013/0151453 | A1 * | 6/2013 | Bhanot | G06N 7/005 |
| | | | | 706/46 |
| 2017/0300552 | A1 * | 10/2017 | Mandadi | G06F 16/273 |
| 2018/0239676 | A1 * | 8/2018 | Glebe | G06F 11/2094 |
| 2018/0239796 | A1 * | 8/2018 | Song | G06F 16/282 |
| 2020/0097615 | A1 * | 3/2020 | Song | G06F 16/215 |
| 2020/0110761 | A1 * | 4/2020 | Cooper | G06N 5/043 |

* cited by examiner

*Primary Examiner* — Tony Mahmoudi
*Assistant Examiner* — Umar Mian
(74) *Attorney, Agent, or Firm* — Haynes and Boone, LLP

(57) ABSTRACT

Systems and methods that describe a graph database system with an online component and an offline component, are provided. Write events that modify a first graph in a real-time graph database included in the online component are received. Graph logs that include changes to the first graph in the real-time graph database caused by the write events are generated. The graph logs are transmitted to an offline component of the graph database system in a chronological order. A second graph in the offline component is modified using the graph logs. The first graph and the second graph are instantiated using a graph schema.

20 Claims, 12 Drawing Sheets

GRAPH DATABASE SYSTEM

TECHNICAL FIELD

The disclosure generally relates to a graph database, and more specifically to a graph database system scalable to support numerous vertices and edges, and process graph queries with low query latency.

BACKGROUND

Conventional graph databases may model different use cases in terms of the key-value data sets. However, these conventional graph databases are not scalable to support vast numbers, which can reach into the trillions, of vertices and edges, do not efficiently retrieve data in real-time, and are not stable and reliable for real-time production use. Accordingly, there is a need for an efficient, real-time graph database system that stores graphs with large quantities of vertices and edges and is optimized to efficiently retrieve the data from the vertices and edges in a real-time environment.

Figure 1A:
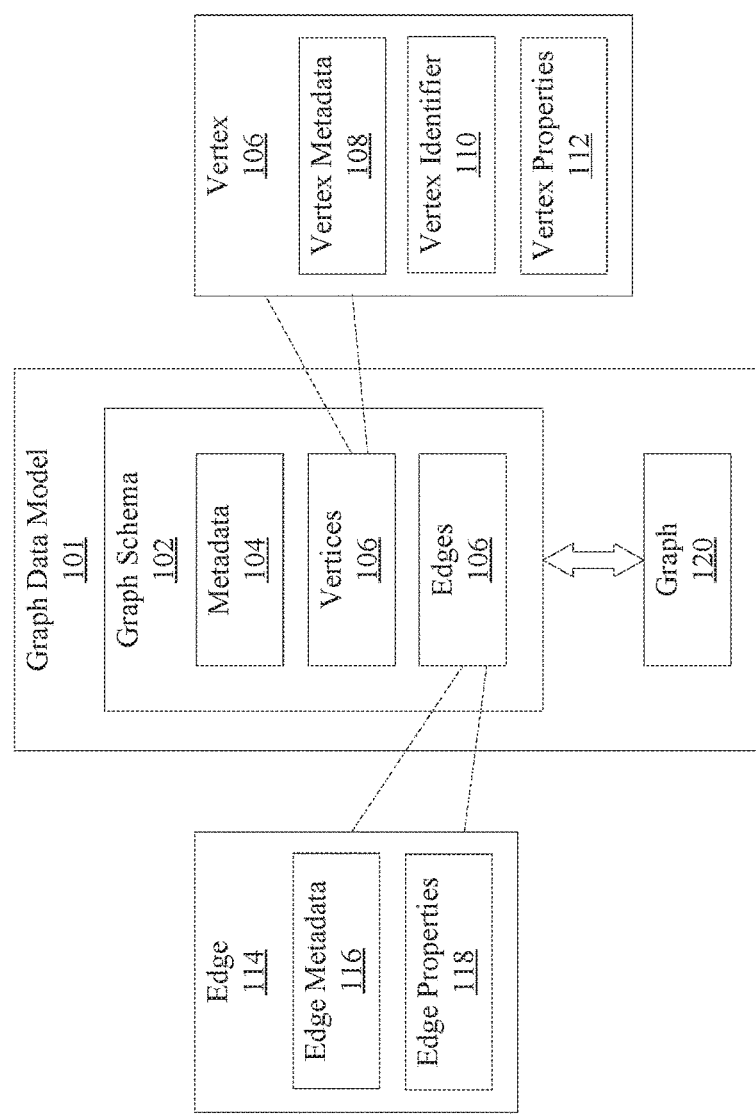
FIGS. 1A and 1B are examples of a graph data model, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments are directed to a graph database system that includes online and offline components. The online component includes a real-time graph database and the offline component includes an offline graph database. The graphs in the real-time graph database and offline graph database are instantiated from the same graph schemas.

In the embodiments, the graphs may include vertices that are connected by edges. Both vertices and edges may be configured to include one or more properties.

In the embodiments, the online component may receive events that include transactions. Data from the transactions may be stored in a graph in the real-time graph database. Data and operations that act on the graph in the real-time database may be included in graph logs. The graph logs may be transmitted to the offline component in a chronological order.

In the offline component, a graph in the offline graph database may be updated using data and operations in the graph logs. Additionally, the offline component may generate snapshots of the graph in the offline graph database at configurable time intervals. Each snapshot may store the state of the graph at a particular point in time.

In some embodiments, offline component may use snapshots and graph logs to test graphs in offline graph database. The offline component may also use graph logs or snapshots and graph logs to recover the corresponding graph in the real-time graph database.

Further description of the embodiments is discussed with reference to the figures below.

FIG. 1A is a block diagram 100A of an exemplary graph database model where embodiments can be implemented. A graph database model 101 may represent one or more graph schemas 102. Each graph schema 102 may instantiate one or more database graphs 120 or simply graphs 120 in a graph database.

Graph schema 102 may include metadata 104, definitions for one or more vertices, and definitions for one or more edges 114. Metadata 104 may store information associated with graph schema 102. Example information may include a description of graph schema 102, a version of graph schema 102, data and/or time that graph schema 102 was last modified, etc.

Graph schema 102 may also include one or more vertices 106. Vertices 106 may different types and include different properties and characteristics. Each vertex 106 may include vertex metadata 108, a vertex identifier 110, and one or more vertex properties 112. Vertex metadata 108 may include information associated with vertex 106, such as an index set on vertex 106, time-to-live information which indicates when vertex 106 becomes obsolete and may be deleted, description of vertex 106, etc. Vertex identifier 110 may identify vertex 106 in the graph that is instantiated using graph schema 102 and may be used to access vertex 106. In a non-limiting embodiment, vertex identifier 110 may be unique to each vertex 106. Vertex properties 112 may store data that is assigned to vertex 106. For example, vertex 106 that is of an address type may include properties such as country, city, and street. In another example, vertex 106 that is of an account type may include properties such as first name, last name, account information, etc. In some embodiments, vertices 106 of different types have different properties that may be defined in graph schema 102.

In some embodiments, graph schema 102 may include edges 114 and define properties or characteristics for edges 114. Edges 114 may include relationships between two vertices 106 in graph schema 102. Edges 114 may be directional or bi-directional. A directional edge is edge 114 that shows a relationship from a first vertex of vertices 106 to a second vertex of vertices 106 in one direction, while bi-directional edge is edge 114 that may show a relationship between a first vertex of vertices 106 and a second vertex of vertices 106 in both directions. Like vertices 106, edges 114 may include edge metadata 116 and edge properties 118. Edge metadata 116 may include information such as a description of edge 114 and index of edge 114 that may be used by a storage engine and query engine, discussed below, to search graph 120 and also for query optimizations. Edge properties 118 may be specific to a type of an edge and, like vertex properties 112 may store data that is associated with edge 114.

Figure 1B:
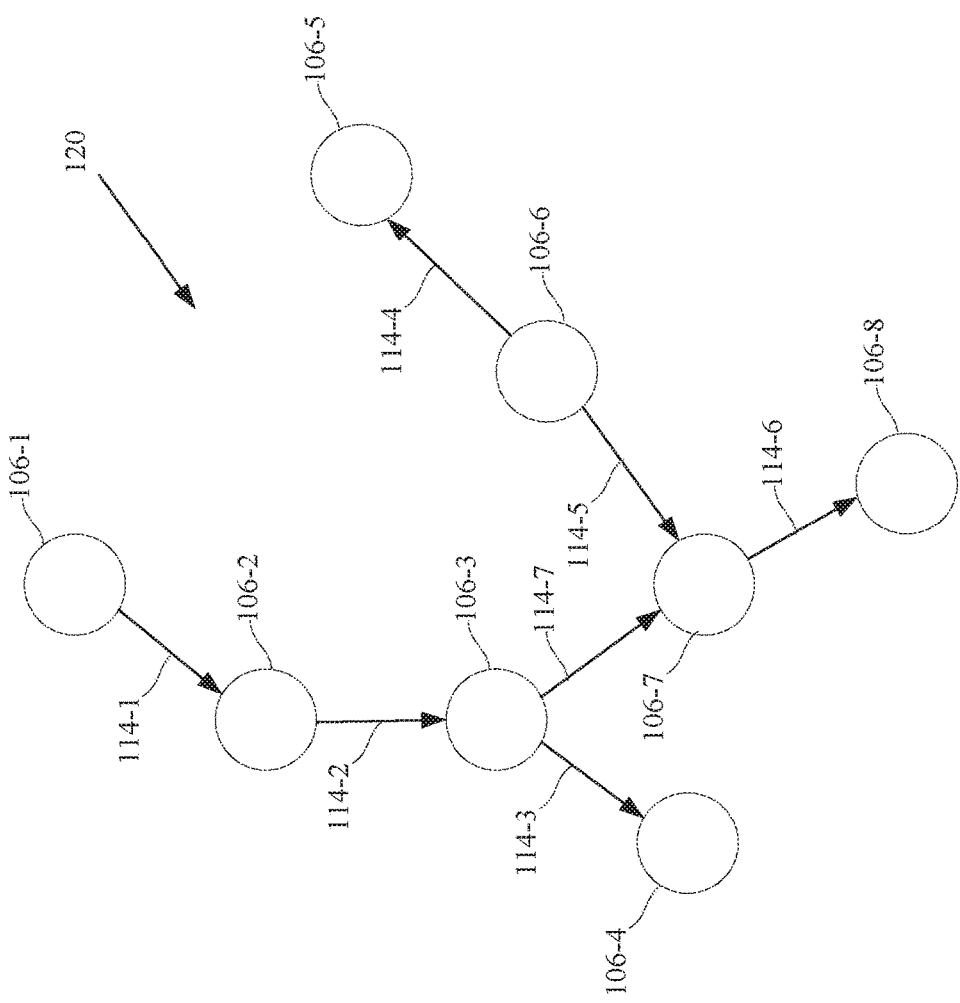

FIG. 1B is a diagram of graph 120 instantiated using graph schema 102 that includes vertices 106 and edges 114, according to some embodiments. As illustrated in FIG. 1B, graph 120 includes vertices 106-1 to 106-8 that are connected by edges 114-1 to 114-7.

Going back to FIG. 1A, in an embodiment, vertex properties 112 and edge properties 118 may have different data types. Example data types may be "string", which indicates a character sequence, "char", which indicates an individual character, "boolean" which indicates true or false, "byte", which indicates a byte value, "short", which indicates a short integer, "long" which indicates a long value, "float", which indicates a four byte floating point number, "double" which indicates an eight byte floating point number, "list" which indicates a list type, and "set" which indicates a set type.

In some embodiments, graph schema 102 called AccountLinkageGraph that includes vertices 106 called Account, IP, and Address and edges 114 called IPAccountUsedBy and AddressAccountUsedBy, and may be defined as follows:

```
graph AccountLinkageGraph {
    metadata {
        index : 0;
        description : "";
        version : 1;
        lastModified : "2018/10/9";
    }
    vertex Account {
        metadata {
            ttl : 63072000; // // 2 years, in seconds
            description : "";
            index : 0;
        };
        define id { // index is 0
            accountID : long;
        };
        define properties {
            firstName : string not null : 1;
            lastName : string not null : 2;
            ...
            property1 : list<int> default null : n;
            property2 : set<string> : n + 1;
            ...
        };
    };
    vertex IP {
        metadata {
            ttl : 63072000; // // 2 years, in seconds
            description : "";
            index : 1;
```

```
        };
        define id { // index is 0
            ip : int;
        };
        define properties {
            country: string : 1;
            ...
        };
    };
    vertex Address {
        metadata {
            ttl : 63072000; // // 2 years, in seconds
            description : "";
            index : 2;
        };
        define id { // index is 0
            normalizedAddress : string;
        };
        define properties {
            country : string : 1;
            city : string : 2;
            street : string : 3;
            ...
        }
    }
    ...
    edge IPAccountUsedBy {
        define edge IP -> Account;
        metadata {
            description : "";
            index : 0;
        };
        define properties {
            property1 : string : 1;
            property2 : int : 2;
            ...
        };
    };
    edge AddressAccountUsedBy {
        define edge Address -> Account;
        metadata {
            description : "";
            index : 0;
        };
        define properties {
            property1 : string : 1;
            property2 : int : 2;
            ...
        };
    };
};
```

As shown above, edge IPAccountUsedBy connects vertex IP and vertex Account, and edge AddressAccountUsedBy connects vertex Address and Vertex Account.

In some embodiments, once vertices 106 and edges 114 are defined in graph schema 102, graph schema 102 may be instantiated into one or more instances of graph 120. For example, Graph schema AccountLinkageGraph may instantiate graph AccountLinkageGraph. Graphs 120 may store data in a database system using vertices 106 and edges 114 as defined in graph schema 102.

Figure 2:
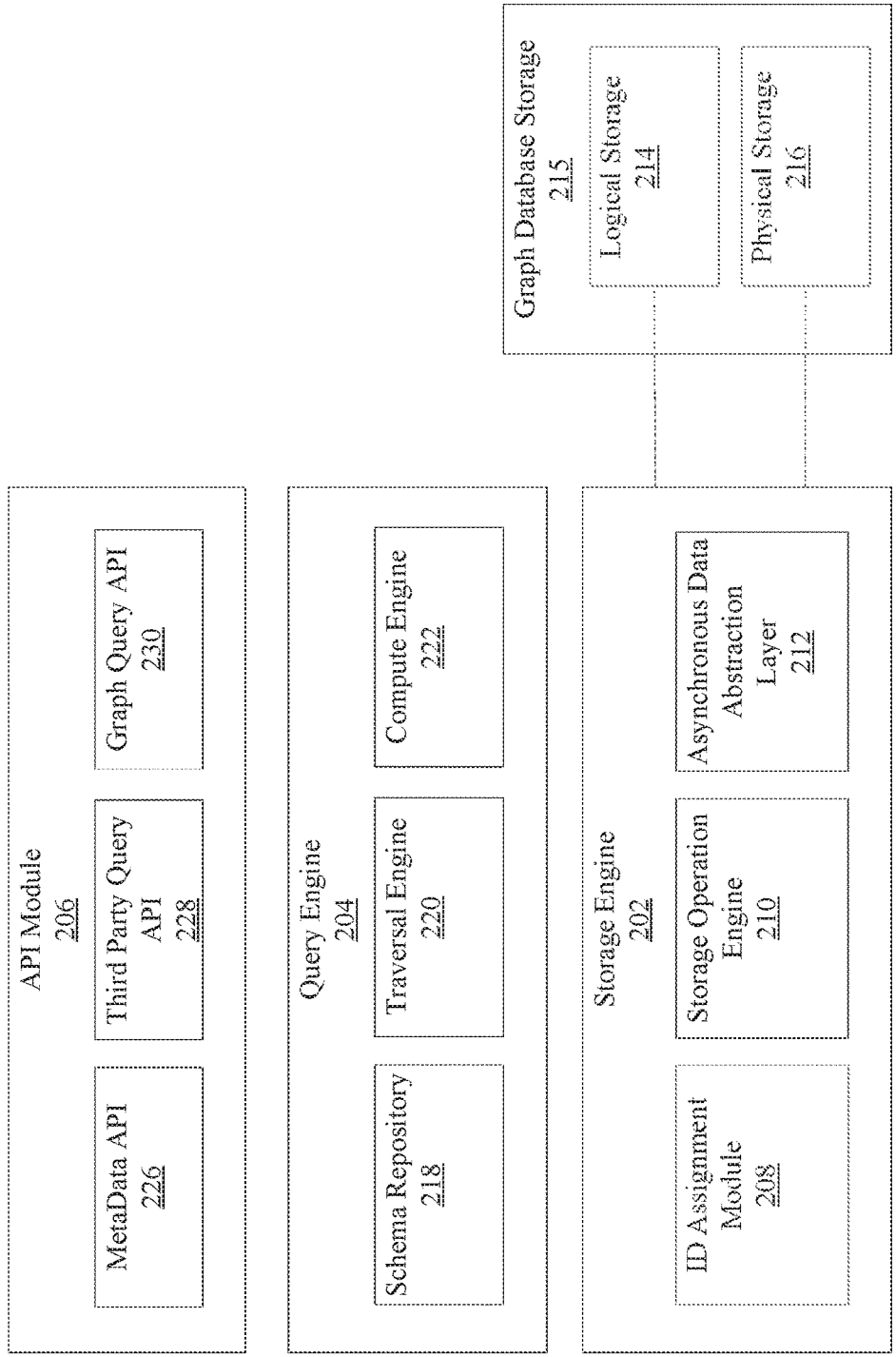
FIG. 2 is a block diagram of components in a graph database system, according to some embodiments.

FIG. 2 is a block diagram 200 of components in a graph database system, according to some embodiments. The graph database system may include a storage engine 202, a query engine 204, and an application interface (API) module 206. The graph database system may be a key-value database system that stores data in terms of structures, such as graphs 120, rather than tables as do conventional database systems.

In some embodiments, storage engine 202 may include an identifier (ID) assignment module 208 and a storage operation engine 210. ID assignment module 208 may assign an identifier, such as vertex identifier 110 to each vertex 106 in graph 120.

Storage operation engine 210 may support operations that insert vertices 106 and edges 114 into a graph 120. For example, storage operation engine 210 may include an upsert vertex operation that inserts vertex 106 into a graph 120, upsert edge operation that inserts edge 114 into a graph 120, delete vertex operation that deletes vertex 106 from graph 120 and a delete edge operation that deletes edge 114 from graph 120. In an embodiment, upsert vertex operation, upsert edge operation, delete vertex operation, and delete edge operation may be key/value operations.

In some embodiments, storage engine 202 may also include an asynchronous data abstraction layer 212. Asynchronous data abstraction layer 212 may support non-blocking I/O for storage engine 202 access. Asynchronous data abstraction layer 212 may also have tabular support that is optimized to filter and extract a subset of information from vertices 106. Asynchronous data abstraction layer 212 may include optimized key-value access, fully scalable read and write support for vertices 106 and edges 114, computation support for vertices 106, and storage operational transparency, such as fail-over, fallback, etc., operations.

In some embodiment, storage engine 202 may store data for graph 120 in a graph database storage 215. Graph database storage 215 may be one of storages discussed in FIG. 11. In some embodiments, graph database storage 215 may include a logical storage 214 and a physical storage 216. Logical storage 214 may store graphs 120, including vertices 106 and edges 114 from graph 120. Physical storage 216 may include clusters that make up graph 120 and the physical location in memory for the clusters. Clusters may be portions of graph 120 that are divided among different memories included in physical storage 216 when graph 120 becomes too big. This may occur, for example, when graph 120 that has vertices 106 and/or edges 114 that are above a configurable vertex or edge threshold or graph 120 that uses more memory space than available memory in physical storage 216. To divide graph 120 among different memories in physical storage 216, graph 120 may be divided into multiple clusters. To divide graph 120 into multiple clusters, asynchronous data abstraction layer 212 may divide vertices 106 of graph using a hash or mod function. Asynchronous data abstraction layer 212 may then include vertices 106 with a first output of the hash or mod function into a first cluster and vertices 106 with a second output into a second cluster. The clusters are stored in physical storage 216. Notably, graph 120 may be divided into more than two clusters using hash or mod functions that generate multiple outputs.

In some embodiments, query engine 204 may include a graph schema repository 218, a traversal engine 220, and a compute engine 222. Graph schema repository 218 may store one or more graph schemas 102 from which graph database system may instantiate graphs 120.

In some embodiments, traversal engine 220 may receive a traversal query and traverse the database graph with the traversal query from, for example, API module 206. Traversal engine 220 may generate one or more threads for each traversal query and then traverse graph 120 using the one or more threads. In some embodiments, traversal engine 220 may generate a single thread per traversal query, and traverse graph 120 using the single thread.

In some embodiments, compute engine 222 may include one or more algorithms that can compute statistics on graph 120, algorithms used to traverse graph 120, etc.

In some embodiments, API module 206 may include various application programming interfaces (APIs), such as a metadata API 226, a third-party query API 228, and a graph query API 230. Metadata API 226 may provide an interface that retrieves and displays metadata of one or more graph schemas 102 to users that use the graph database. Third-party query API 228 may receive a graph query that is written in another language, such as Gremlin, and translate the third-party API into format compatible with database architectures described herein. Graph query API 230 is an API that receives query input from a user that may be answered using graph 120.

Figure 3:
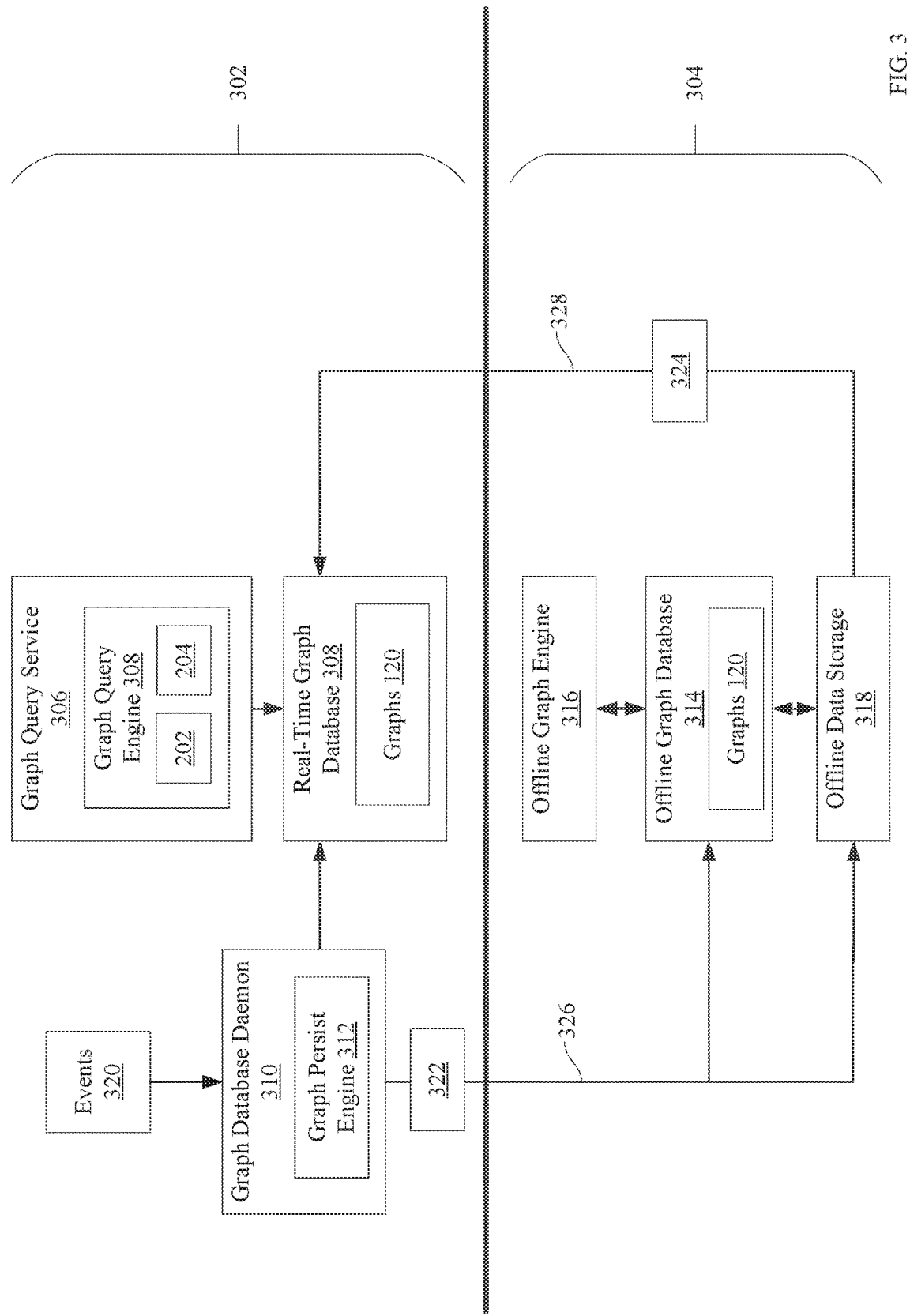
FIG. 3 is a block diagram of a real-time graph database architecture, according to some embodiments.

FIG. 3 is a block diagram 300 of a real-time graph database architecture, according to some embodiments. As illustrated in block diagram 300, the real-time graph database architecture may have an online component 302 and an offline component 304. Online component 302 may store the real-time database with graphs 120 that may be used by a real-time production environment. Offline component 304 may store an offline database with graphs 120. Unlike conventional database systems, offline component 304 has the same graphs 120 and data as the real-time database. In other words, graph 120 in real-time graph database 308 and offline graph database 314 may be generated from the same graph schemas 102 and store the same data.

In some embodiments, offline component 304 may also be used to simulate graphs 120 in a non-production environment, recover graphs 120 and data in graphs 120 in online component 302 in the event of a computer crash or data corruption, and test new graph schemas 102 and new types of vertices 106 and edges 114 defined in the new graph schemas 120 prior to adding new vertices 106 and edges 114 to online component 302.

In some embodiments, included in online component 302 may be a graph query service 306 that includes query engine 204 and storage engine 202 discussed in FIG. 2, a real-time graph database 308 that includes database graphs 120 generated using graph schemas 102, and a graph database daemon 310 that includes a graph persist engine 312.

In some embodiments, included in offline component 304 are an offline graph database 314, an offline graph engine 316 and an offline data storage 318.

In some embodiments, real-time graph database 308 and offline graph database 314 may store graphs 120 instantiated using the same graph schemas 102. Real-time graph database 308 may store graphs 120 that are used in production environment and that store current, real-time, data. Offline graph database 314 may store graphs 120 that are copies of graphs 120 in real-time graph database 308. Real-time graph database 308 and offline graph database 314 may be included in graph database storage 215 (not shown). Typically, the memory used by real-time graph database 308 is optimized for fast storage and retrieval as the transactions are time dependent. Offline graph database 314, on the other hand, may or may not be as optimized for fast storage and retrieval as real-time graph database 308 since transactions directed toward offline graph database 314 may or may not be time dependent. Additionally, offline graph database 314 may also store data from online component 302.

In some embodiments, offline graph engine 316 may include query engine 204 and storage engine 202 (not shown) which may be the same as or different from query engine 204 and storage engine 202 in online component 302.

In some embodiments, graph database architecture may receive events 320. Events 320 may be write events that insert data into graph 120 stored in real-time graph database 308. Example events may be transactions that exchange money, include data pertaining to participants of the transactions, bank information associated with the transactions, etc. In some embodiments, graph database daemon 310 may receive events 320 and use a graph persist engine 312 to store data from events 320 to one or more vertices 106 and/or edges 114 of graph 120 in real-time graph database 308.

In some embodiments, a graph database daemon 310 may generate graph logs 322 from events 320. Graph logs 322 may include incremental changes to graph 120 in real-time graph database 308 that result from one or more events 320. For example, graph logs 322 may include mutations to one or more vertices 106 or edges 114 within graph 120 that may result from the upsert and delete operations that insert or delete data from graph. In some embodiments, graph database daemon 310 may timestamp graph logs 322. The timestamp may indicate a time that graph database daemon 310 received event 320 or graph persist engine 312 updated graph 120 in real-time graph database 308 in response to event 320. In this way, graph logs 322 may be stored or accessed in chronological order according to a timestamp of each graph log 322.

In some embodiments, graph database daemon 310 may transmit graph logs 322 to offline component 304 via an online-to-offline pipeline 326. Online-to-offline data pipeline 326 may be a wired or wireless network or connection between online component 302 and offline component 304. Graph logs 322 may be transmitted as a stream of data or at configurable time increments and stored in offline data storage 318. In some embodiments, graph logs 322 are transmitted and stored in chronological order, according to a timestamp.

In some embodiments, graph logs 322 may be stored in offline data storage 318. Offline data storage 318 may be conducive to storing large quantities of data. Additionally, offline graph engine 316 may update graphs 120 in offline graph database 314 with operations and data from graph logs 322. Because offline component 304 may use graphs logs 322 from events 320 that updated graphs 120 in real-time graph database 308, graphs 120 in offline graph database 314 updated using graph logs 322 should have the same updates as graph 120 in real-time graph database 308.

In some embodiments, offline component 304 may use graph logs 322 to re-create graphs 120 in real-time graph database 308 in the event of the system crash. This is because, graph logs 322 store mutations to graphs 120 in real-time graph database 308. Additionally, offline component 304 may use graph logs 322 to perform various analytics on offline graph database 314.

In some embodiments, real-time graph database architectures may include an offline-to-online pipeline 328 between offline component 304 and online component 302. A real-time graph database architecture may use offline-to-online pipeline 328 to update graph 120 in real-time graph database 308 with data, graphs 120, graph schemas 102 from offline graph database 314.

Figure 4:
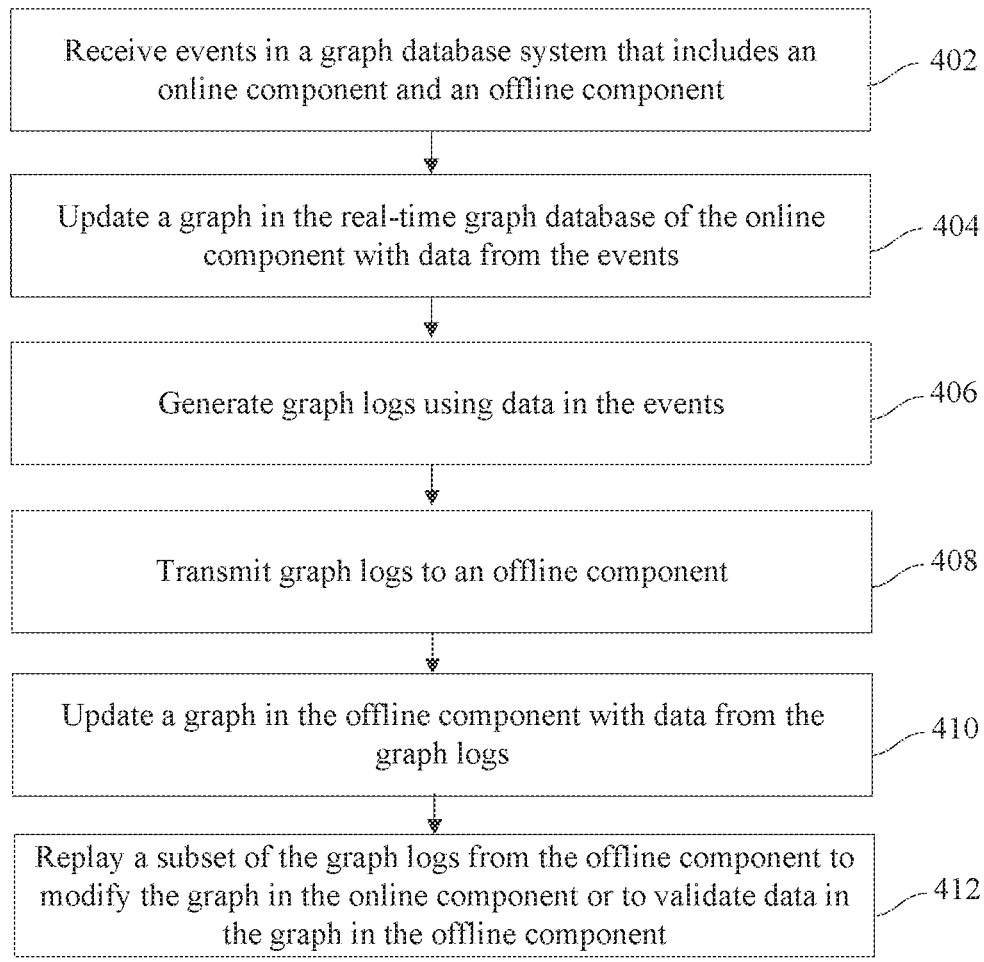
FIG. 4 is a flowchart of a method for updating graphs, according to some embodiments.

FIG. 4 is a flowchart of a method 400 for updating graphs, according to some embodiments. Method 400 may be performed using hardware and/or software components described in FIGS. 1-3 and 11. Note that one or more of the operations may be deleted, combined, or performed in a different order as appropriate.

At operation 402, events are received. For example, events 320 that include data to be stored in real-time database is received. For example, online component 302 may receive events that may be an online transaction, a new user account, etc.

At operation 404, a graph in a real-time graph database is updated. For example, graph persist engine 312 may store or remove data associated with events 320 in real-time graph database 308. As discussed above, graph persist engine 312 may use upsert or delete operations to store, update, or remove data.

At operation 406, graph logs are generated. For example, graph persist engine 312 may generate graph logs 322 from events 320. Graph logs 322 may include data from events 320 and also upsert or delete operations that graph persist engine 312 used to insert or delete data from events 320 to/from real-time graph database 308. Along with data and operations, graph persist engine 312 may also include a timestamp in graph logs 322. The timestamp may indicate that graph database daemon 310 received each event 320 or graph persist engine 312 updated graphs 120 in real-time graph database 308 with data from event 320.

At operation 408, graph logs are transmitted. For example, graph database daemon 310 may transmit graph logs 322 from online component 302 to offline component 304 using online-to-offline pipeline 326. As discussed above, graph database daemon 310 may transmit graph logs 322 to offline component 304 in chronological order, according to a timestamp, in some embodiments.

At operation 410, a graph in an offline database is updated with the logs. For example, offline graph engine 316 may update graphs 120 in offline graph database 314 using data and operations included in graph logs 322. Additionally, offline graph engine 316 may also store graph logs 322 in offline data storage 318.

At operation 412, a subset of graph logs is replayed. In one example, offline graph engine 316 may replay a subset of graph logs 322 to update or re-create graphs 120 in real-time database 308. For example, offline graph engine 316 may generate graph logs 324 and transmit graph logs 324 to real-time graph database 308 over offline-to-online pipeline 328. Graph query service 308 may then modify graph 102 in real-time graph database 308 using graph logs 324. Such replay may occur when data in graph 120 in real-time graph database 308 is corrupted and graph 120 may be recovered using graph logs 324. In another example, the subset of graph logs 322 may be replayed on a snapshot of graph 120 of offline graph database 314, described below, to validate data in graph 120, test optimization algorithms that insert data into graph 120, test optimization algorithms that query data from graph 120, etc.

Going back to FIG. 3, in some embodiments, offline graph engine 316 may provide instructions that modify graph schema 102. Instructions may be received over a user interface provided in offline graph engine 316 or included in a configuration file, in some embodiments. Example instructions may add, delete or modify vertex 106 and/or edge 114. Offline component 102 may test the changes to graph schema 102 and then update a corresponding graph 120 in real-time graph database 308 with values that correspond to updated graph schemas 102.

For example, offline graph engine 316 may use instructions to modify graph schema 102 that adds a new vertex 106 or a new edge 114 to graph 120 in offline graph database 314. To test graph 120 that corresponds to the modified graph schema 102, offline graph engine 316 may retrieve graph logs 322 from offline data storage 318 and update the new vertex 106 or new edge 114 with historical data from graph logs 322. The updated graph 120 may be validated using criteria that is configured using offline graph engine 316

In some embodiments, offline graph engine 316 may propagate changes to graph 120 from the modified graph schema 102 to graph 120 in real-time graph database 308. For example, offline graph engine 316 may generate graph logs 324 that include a mutation that generates a new vertex 106 or a new edge 114 and the corresponding data for the new vertex 106 or the new edge 114. Once changes to graph schema 102 are tested and validated on graph 120 in offline graph database 314, offline graph engine 316 may transmit graph logs 324 using offline-to-online pipeline 328 to real-time graph database 308. Real-time graph database 308 may then use graph logs 324 to add new vertex 106 or new edge 114 to graph 120 in real-time graph database 308. Additionally, query engine 204 also updates a corresponding graph schema 102 in online component 302 with the new vertex 106 or the new edge 114.

Figure 5:
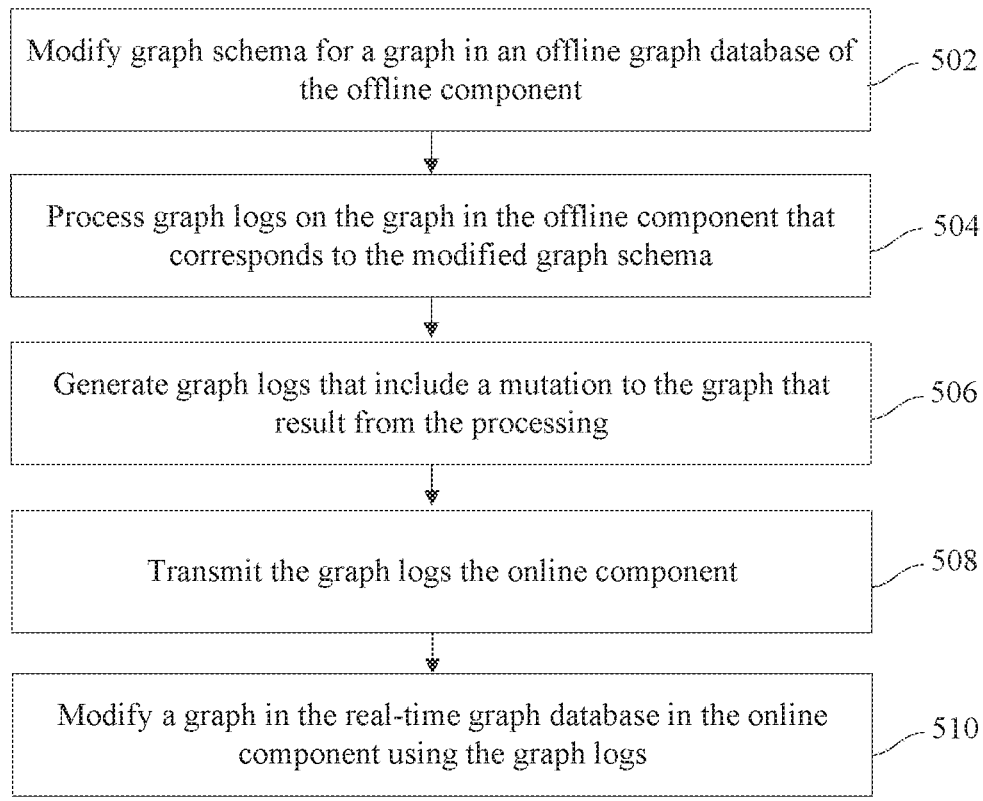
FIG. 5 is a flowchart of a method for updating data in a graph in a real-time graph database based on a modified schema, according to some embodiments.

FIG. 5 is a flowchart of a method 500 for updating data in a graph in a real-time graph database based on a modified schema, according to some embodiments. Method 500 may be performed using hardware and/or software components described in FIGS. 1-3 and 11. Note that one or more of the operations may be deleted, combined, or performed in a different order as appropriate.

At operation 502, a modified graph schema for a graph is created. For example, offline graph engine 316 may modify graph schema 102 that corresponds to graph 120 in offline graph database 314. As discussed above, offline graph engine 316 may receive instructions from a user interface or in a configuration file that may be used to modify graph schema 102.

At operation 504, graph logs are processed on a graph that corresponds to the modified graph schema. For example, offline graph engine 316 may process all or a set of graph logs 322 stored in offline data storage 318 on graph 120 that corresponds to the modified graph schema 102.

At operation 506, graph logs that include a mutation to the graph are generated. For example, offline graph engine 316 may generate graph logs 324 that include operations that generate a new vertex 106 or a new edge 114 and also data included in the new vertex 106 or edge 114 after the processing in operation 504. Graph logs 324 may also include instructions that may modify graph schema 102 in online component 302.

At operation 508, graph logs are transmitted to the online component. For example, offline graph engine 316 may cause graph logs 324 to be transmitted to online component 302 using offline-to-online pipeline 328.

At operation 510, a graph in a real-time graph database is modified. For example, storage engine 202 may modify graph 120 in real-time graph database 308 using data and operations in graph logs 324. Additionally, graph logs 324 may also modify graph schema 102 that is associated with graph 120 in real-time graph database 308.

Going back to FIG. 3, in some embodiments, offline component 304 may determine a value for vertex property 112 or edge property 118 in graph 120 in offline graph database 314 and vertex property 112 or edge property 118 in graph 120 in real-time graph database 308 with the determined value. For example, offline graph engine 316 may determine a value for vertex property 112 in one of vertices 106 of graph 120 in offline graph database 314. The value may be determined by replaying graph logs 322 on a snapshot of graph 120 or by injecting a value into vertex property 112 or edge property 118 using offline graph engine 316. Offline graph engine 316 may then generate graph logs 324 that include the value of vertex property 112 or edge property 118 along with operations that may insert the value into graph 120. In some embodiments, offline graph engine 316 may first validate the value prior to generating graph logs 324. Once graph logs 324 are generated, offline graph engine 316 may transmit graph logs 324 to real-time graph database 308 through offline-to-online pipeline 328 to update the corresponding vertex property 112 or edge property 118 in graph 120 in real-time graph database 308.

Figure 6:
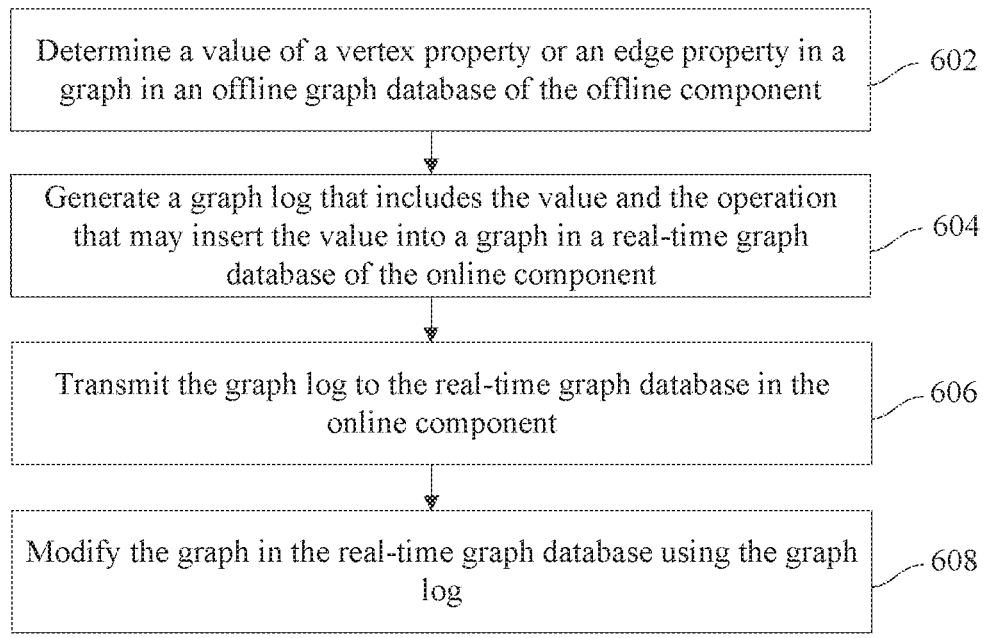
FIG. 6 is a flowchart of a method for updating data in a graph in a real-time graph database, according to some embodiments.

FIG. 6 is a flowchart of a method 600 for updating data in a graph in a real-time graph database, according to some embodiments. Method 600 may be performed using hardware and/or software components described in FIGS. 1-3 and 11. Note that one or more of the operations may be deleted, combined, or performed in a different order as appropriate.

At operation 602, a value for a vertex or an edge in a graph is determined. For example, offline graph engine 316 may replay some or all graph logs 322 on a snapshot or on graph 120 in offline graph database 314 to determine a value for vertex property 112 in vertex 106 or edge property 118 in edge 114 of graph 120 in offline graph database 314.

At operation 604, a graph log that includes the value is generated. For example, offline graph engine 316 may generate graph log 324. Graph logs 324 may include a value for vertex property 112 in vertex 106 or edge property 118 in edge 114 of graph 120 in offline graph database 314 and an operation that may insert the value into graph 120 in real-time graph database 308.

At operation 606, a graph log is transmitted to the online component. For example, offline graph engine 316 may cause graph log 324 to be transmitted to online component 302 using offline-to-online pipeline 328.

At operation 608, a graph in a real-time graph database is modified using the graph log. For example, storage engine 202 may update graph 120 in real-time graph database 308 using the value and operations in graph log 324.

Going back to FIG. 3, in some embodiments, offline component 304 may provide recovery data for graph 120 in real-time graph database 308. For example, graph 120 or cluster in graph 120 in real-time graph database 308 may include corrupted data that may cause the cluster or graph 120 in real-time graph database 308 to crash or provide incorrect data in response to queries. The corrupted data may result from a memory overwrite or corrupted data that was included in event 320, in some embodiments. To recover graph 120 in real-time graph database 308, offline graph engine 316 may retrieve a cluster or a snapshot of graph 120 from a configurable point in the past, such as a first point in time, from offline data storage 318. Offline graph engine 316 may then retrieve graph logs 322 from the first point of time until a recovery point in time. Offline graph engine 316 may receive a recovery point in time using a user interface in a non-limiting embodiment. Offline graph engine 316 may then transmit the snapshot from the first point in time and graph logs 322 as graph logs 324 from the first point in time to the recovery point in time to real-time graph database 308 over the offline-to-online pipeline 328. Real-time graph database 308 may recover graph 120 by saving the snapshot as graph 120 and then modifying the snapshot by processing data and operations in graph logs 324 in chronological order.

In some embodiments, a snapshot of graph 120 may be the state of the graph 120, including vertices 106, edges 114, and data stored in vertices 106 and edges 114 at a particular point in time. As offline component receives graph logs 322 that modify graph 120, offline graph engine 316 may generate snapshots that store the state of graph 120 at configurable time intervals and store the snapshots in offline data storage 318.

For example, offline graph engine 316 may instantiate graph 120 using graph schema 102 at a first point in time. Once instantiated, offline graph engine 316 may update graph 120 using data and operations included in graph logs 322 that are received between the first point and a second point in time. At the second point in time, offline graph engine 316 may store the state of graph 120 as a first snapshot and save the snapshot of graph 120 in offline data storage 318. Next, as offline component 304 receives graph logs 322 from online component 302 after the second point in time, offline graph engine 316 may update graph 120 using data and operations in graph logs 322 between the second point in time and a third point in time. At the third point in time, offline graph engine 316 may save the state of graph 120 as a second snapshot, and store the second snapshot of graph 120 in offline data storage 318. Offline graph engine 316 may continue to generate snapshots of graph 120 at configurable time intervals as described above.

As discussed above, offline graph engine 316 may use snapshots to recover the state of graph 120 if data in graph 120 is corrupted. Additionally, offline graph engine 316 may use snapshots to test and validate data that may be stored to graph 120, test new storage and retrieval algorithms, etc.

Figure 7:
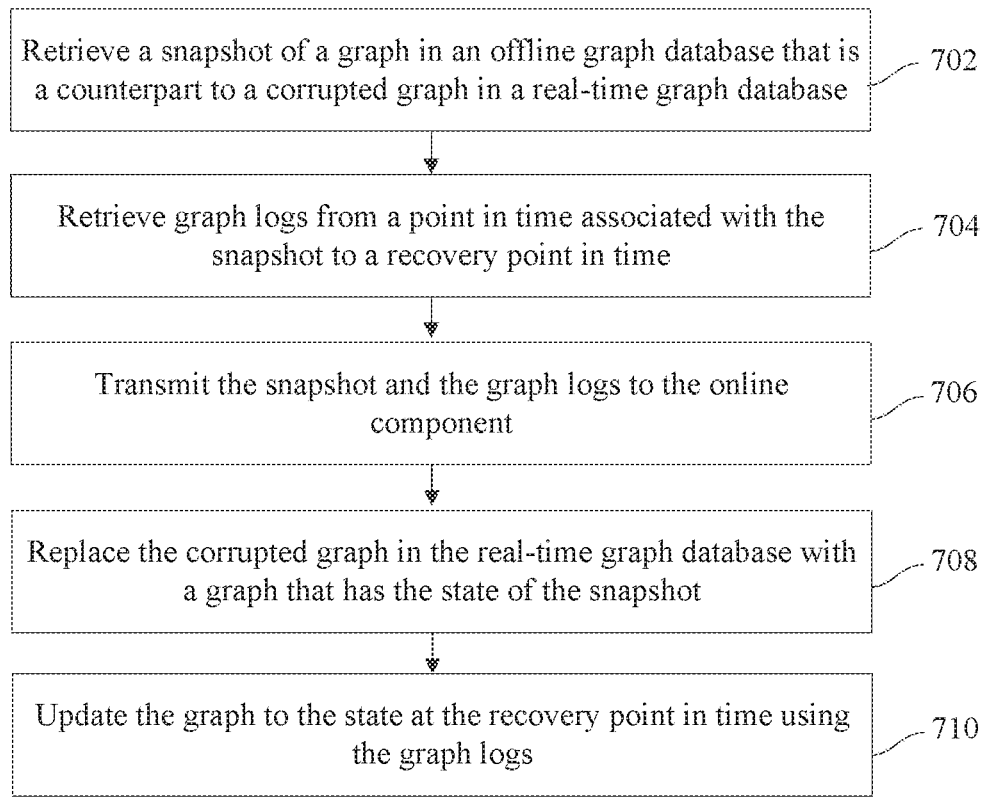
FIG. 7 is a flowchart of a method for recovering a graph in a real-time graph database, according to some embodiments.

FIG. 7 is a flowchart of a method 700 for recovering a graph in a real-time graph database, according to some embodiments. Method 700 may be performed using hardware and/or software components described in FIGS. 1-3 and 11. Note that one or more of the operations may be deleted, combined, or performed in a different order as appropriate. Prior to operation 702, graph 120 in real-time graph database 308 may have been corrupted.

At operation 702, a snapshot is retrieved. For example, offline graph engine 316 may retrieve a snapshot of graph 120 from offline data storage 318. The snapshot may be a state of graph 120 in offline graph database 314 that is a counterpart to graph 120 in real-time graph database 308. The snapshot may be the state of graph 120 at a particular point in time, such as a first point in time. As discussed above, offline graph engine 316 may generate snapshots of graph 120 of offline graph database 314 at configurable time intervals.

At operation 704, graph logs are retrieved. For example, offline graph engine 316 may retrieve graph logs 322 for graph 120 from the first point in time to a recovery point. The recovery point may be a point in time to which graph 120 in real-time graph database 308 may be recovered. Typically, this point of time may be prior to the time graph 120 has been corrupted. In some embodiments, offline graph engine 316 may receive a recovery point in time from a user interface.

At operation 706, a snapshot and graph logs are transmitted to the online component. For example, offline graph engine 316 may cause the snapshot retrieved in operation 702 and graph log 322 retrieved in operation 702 to be transmitted to online component 302 using offline-to-online data pipeline 328. As discussed above, graph logs 322 from the first point in time to the recovery point in time may be graph logs 324.

At operation 708, the snapshot is stored as a graph in real-time graph database. For example, graph query service 306 may replace the corrupted graph 120 with the snapshot in real-time graph database 308. The snapshot may be graph 120 at a first point in time.

At operation 710, the graph is updated using graph logs. For example, graph query service 306 may update graph 120 using graph logs 324. The replayed logs may manipulate the data in graph 120 using the data and operations in graph logs 324. When the replay completes, graph 120 in real-time graph database 308 may have the state that the corrupted graph had at the recover point in time.

Going back to FIG. 3, in some embodiments, graph 120 in real-time graph database 308 may be recovered from graph 120 in offline graph database 314. For example, real-time graph database 308 may lose or corrupt data from graph 120 in real-time graph database 308. In this case, graph 120 in offline graph database 314 may store data that has better quality than data in graph 120 in real-time graph database 308. To provide graph 120 in real-time graph database 308 with data stored in offline graph database 314, graph query service 306 may delete graph 120 or a cluster of graph 120 from real-time graph database 308. Next, graph query service 306 may re-instantiate graph 120 in real-time graph database 308 using graph schema 102. Offline graph engine 316 may then transmit graph logs 322 stored in offline data storage 318 to real-time graph database 308 as graph logs 324 over offline-to-online pipeline 328. As discussed above, graph logs 324 may include data and operations that act on graph 120. Graph query service 306 may replay graph logs 324 in real-time graph database. When graph logs 324 are replayed in chronological order, the operations in graph logs 324 may update graph 120 in real-time graph database 308 with data from graph logs 324. Following the replay, graph 120 in real-time graph database 308 may be recovered from graph logs 324.

Figure 8:
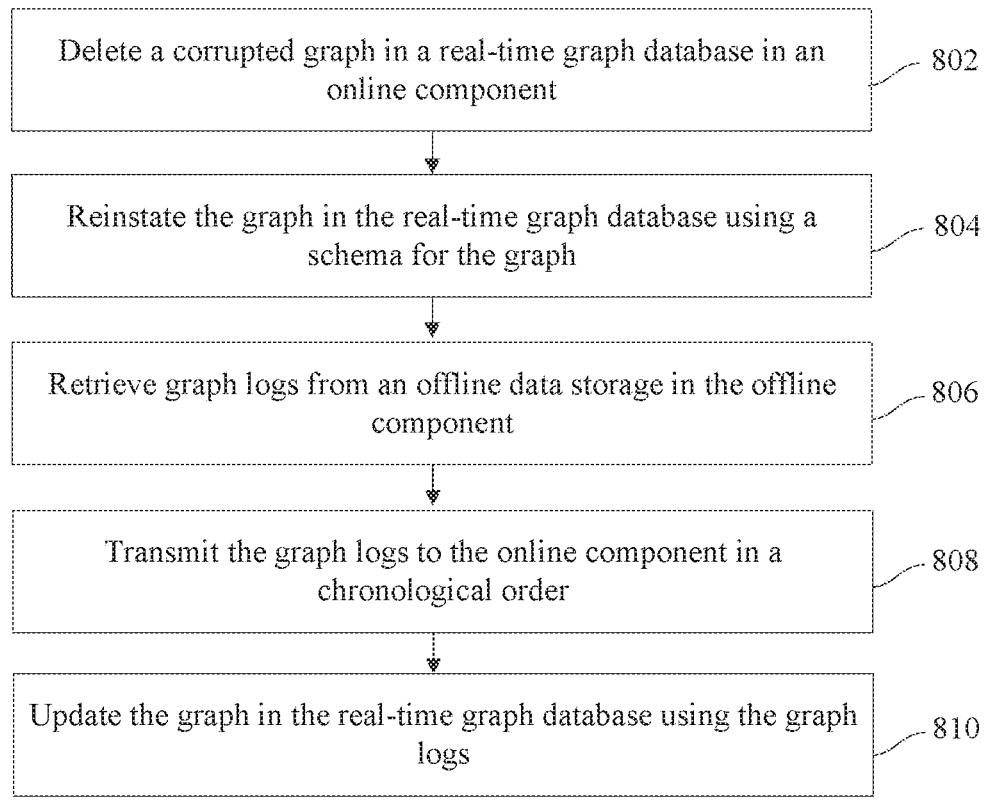
FIG. 8 is a flowchart of a method for recovering a graph in a real-time graph database, according to some embodiments.

FIG. 8 is a flowchart of a method 800 for recovering a graph in a real-time graph database, according to some embodiments. Method 800 may be performed using hardware and/or software components described in FIGS. 1-3 and 11. Note that one or more of the operations may be deleted, combined, or performed in a different order as appropriate. Prior to operation 802, graph 120 in real-time graph database 308 may have been corrupted.

At operation 802, a graph is deleted. For example, graph query service 306 may delete graph 120 that has been corrupted from real-time graph database 308.

At operation 804, a graph is reinstated. For example, graph query service 306 may reinstate graph 120 that has been deleted in operation 802 using graph schema 102. At this point, graph 120 may be an empty graph which does not store data from events 320.

At operation 806, graph logs are retrieved. For example, offline graph engine 316 may retrieve graph logs 322 for graph 120 in offline graph database 314 that is a counterpart to graph 120 that has been deleted in operation 802. In some embodiments, graph logs 322 may be all graph logs 322 that correspond to graph 120 in offline graph database 314.

At operation 808, graph logs are transmitted to the online component. For example, offline graph engine 316 may cause graph log 322 retrieved in operation 806 to be transmitted to online component 302 using offline-to-online pipeline 328. As discussed above, graph logs 322 may be graph logs 324 and are transmitted in a chronological order.

At operation 810, the graph is updated. For example, graph query service 306 may replay graph logs 324. The replayed graph logs 324 may update the data in the graph 120 using the data and operations in graph logs 324. Because graph logs 324 are replayed in chronological order, the state of graph 120 is updated using the sequence of updates that the corrupted graph received from events 320. When the replay completes, graph 120 is reinstated without the corrupted data.

Going back to FIG. 3, in some embodiments, offline component 304 may provide a testing environment for new or updated graphs 120 and new or updated graph schemas 102. The testing environment may be used to conduct experiments that make changes to graphs 120 in offline graph database 314. For example, offline graph engine 316 may perform simulations on graphs 120 in offline graph database 314. Example simulations may include query optimization techniques, adding a new property to vertex 106 or edge 114 in graph 120, removing vertex 106 from graph 120 or vertex property 112 from vertex 106, creating new graphs 120, etc. Simulations may also include how event 320 is processed in offline graph database 314 or how events 320 change a value of vertex property 112 in vertex 106 at a particular time or over time.

In some embodiments, offline graph engine 316 may simulate how vertex property 112 of vertex 106 in graph 120 changes from a first point in time to a second point in time. To perform a simulation on vertex property 112, offline graph engine 316 may retrieve a snapshot of graph 120 from offline graph database 314 at the first point in time. Offline graph engine 316 may then process graph logs 322 stored in offline data storage 318 that have a timestamp from the first point in time to the timestamp at the second point in time. Once graph logs 322 are processed, offline graph engine 316 may retrieve vertex property 112 from vertex 106. In a further embodiment, offline graph engine 316 may select a subset of graph logs 322 to be processed between the first timestamp and the second timestamp. For example, offline graph engine 316 may select graph logs 322 that may manipulate vertex property 112 in vertex 106, and not all graph logs 322 between the first timestamp and the second timestamp.

In yet another example, offline graph engine 316 may simulate the state of graph 120 in offline graph database 314 at a particular point in time, such as a second point in time. To simulate the state of graph 120, offline graph engine 316 may retrieve a graph snapshot at a first point in time (which is before the second point in time) from offline data storage 318, and graph logs 322 from the first point in time to the second point in time. Storage engine 202 may then process graph logs 322 on the graph snapshot and generate a result which is a state of graph 120 at the second point in time. Notably, by making changes to a snapshot and not directly to graph 120, offline graph engine 316 may determine the state of graph 120 at a second point in time without modifying graph 120 in offline graph database 314.

In some embodiments, offline graph engine 316 may also validate the changes to vertex property 112 or to graph 120. The validation may be conducted by comparing data in graph 120 against expected data, or by sampling vertex properties 112 in vertices 106 and edge properties 118 in edges 114 using a user interface.

Figure 9:
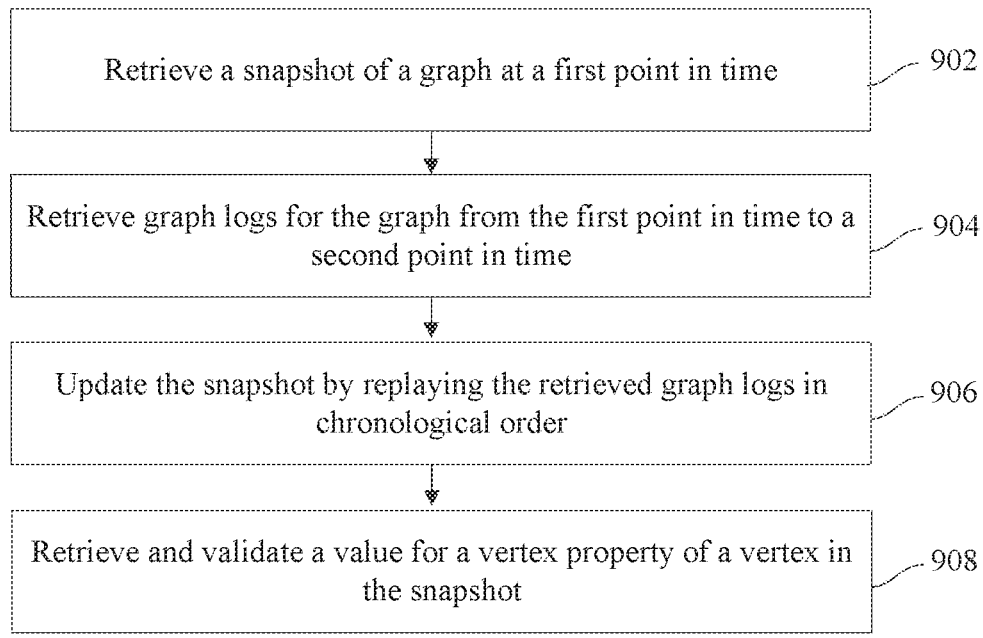
FIG. 9 is a flowchart of a method for simulating changes to a vertex property of a vertex, according to some embodiments.

FIG. 9 is a flowchart of a method 900 for simulating changes to a vertex property of a vertex, according to some embodiments. Method 900 may be performed using hardware and/or software components described in FIGS. 1-3 and 11. Note that one or more of the operations may be deleted, combined, or performed in a different order as appropriate. Notably, a similar method may simulate changes to edge property 118 of edge 114 in graph 120.

At operation 902, a snapshot of a graph at a first point in time is retrieved. For example, offline graph engine 316 may retrieve a snapshot of graph 120 in offline graph database 314 from offline data storage 318. The snapshot may be a state of graph 120 at a first point in time which may be selected by receiving user instructions at offline graph engine 316 in some embodiments.

At operation 904, graph logs from the first point in time to a second point in time are selected. For example, offline graph engine 316 may retrieve graph logs 322 that include timestamps from the first point in time to a second point in time from offline data storage 318. The second point in time may also be received as user instructions or determined by offline graph engine 316.

At operation 906, the snapshot is updated using graph logs selected in operation 904. For example, offline graph engine 316 may update the snapshot retrieved in operation 902 with graph logs 322 retrieved in operation 904. The update may be the replay of graph logs 322 on data in the snapshot in chronological order, such as according to the timestamps in graph logs 322. Notably, the snapshot may be stored separately from graph 120 in offline graph database 314, such that the updates to the snapshot may not affect data stored in graph 120.

At operation 908, a vertex property from a vertex in the graph is retrieved and validated. For example, offline graph engine 316 may receive instructions to retrieve a value from or more vertex properties 112 from one or more vertices 106 of the snapshot. The value of the retrieved vertex property 112 may be validated against one or more expected values or against predefined criteria.

Going back to FIG. 3, in another embodiment, offline graph engine 316 may test changes to graph schema 102 using offline component 304 before moving these changes to online component 302. Example changes to graph schema 102 may be a new type of vertex 106 with new vertex properties 112 or a new type of edge 114 with new edge properties 118, changes to vertex properties 112 of existing vertex 106, changes to edge properties 118 to an existing edge 114, etc. To test changes to graph schema 102, offline graph engine 316 may obtain graph schema 102 from offline data storage 318. Graph schema 102 may be the schema that was used to instantiate graph 120 in real-time graph database 308 and graph 120 in offline graph database 314. Offline graph engine 316 may also define a sub-graph schema. Sub-graph schema may define a subgraph that includes changes to graph 120, such as new one or more vertices 106, edges 114, vertex properties 112 to existing vertices 106 and/or edge properties 118 to existing edges 114. When offline component 304 receives graph logs 322 from events 320, offline graph engine 316 may update graph 120 in offline graph database 314 with data in graph logs 322. Additionally, offline graph engine 316 may also update the sub-graph with data in graph logs 322.

In some embodiments, graph 120 and sub-graph of graph 120 may be stored separately in offline graph database 314. In this way, the changes to sub-graph may not affect data in graph 120. Additionally, there may be multiple different sub-graph schemas and different sub-graphs in offline graph database 314 for each graph 120. In this way, offline graph engine 316 may test different changes to graph 120 without making changes to graph 120 itself.

In some embodiments, offline graph engine 316 may generate a result that merges data from graph 120 and a sub-graph. For example, offline graph engine 316 may use a query to retrieve data from graph 120 and the sub-graph. Once retrieved, offline graph engine 316 may combine the data from graph 120 and the sub-graph into a single result. The result may be a snapshot that includes data in graph 120 and data in the sub-graph. Offline graph engine 316 may display the result using a user interface. In case of multiple sub-graphs, offline graph engine 316 may generate multiple distinct results by merging data graph 120 with data from each sub-graph. Offline graph engine 316 may also validate the result against known data or criteria.

In some embodiments, the sub-graph scheme for the sub-graph may be moved to online component 302. Once moved, sub-graph schema for the sub-graph may be merged with graph schema 102 for graph 120 in real-time graph database 308. Next, offline data storage 318 may replay the source data sets, that may be graph logs 324 to back fill the data in graph 120 that includes the merged graph schema 102.

Figure 10:
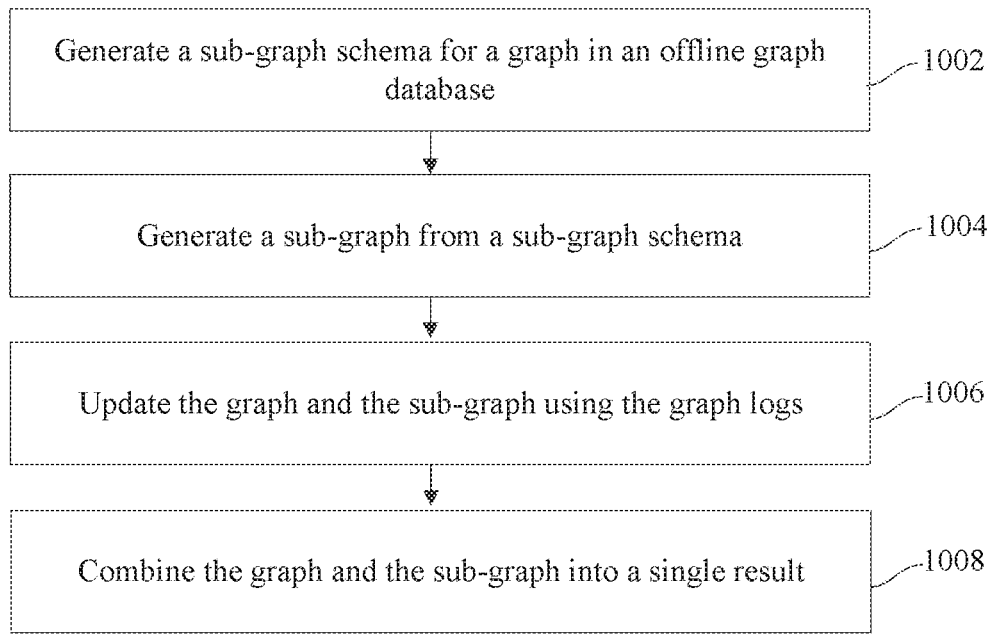
FIG. 10 is a flowchart of a method for testing changes to a graph schema, according to some embodiments.

FIG. 10 is a flowchart of a method 1000 for testing changes to a graph schema, according to some embodiments. Method 1000 may be performed using hardware and/or software components described in FIGS. 1-3 and 11. Note that one or more of the operations may be deleted, combined, or performed in a different order as appropriate.

At operation 1002, a sub-graph schema for a graph in an offline component is generated. For example, offline graph engine 316 may generate a sub-graph schema for graph schema 102 that instantiates graph 120 in offline graph database 314 and graph 120 in real-time graph database 308. As discussed above, the sub-graph may include one or more new vertices 106, edges 114, new vertex properties 112 for vertex 106, and/or new edge properties 118 for edge 114.

At operation 1004, a sub-graph is generated. For example, offline graph engine 316 may generate a sub-graph from sub-graph schema. Notably, the sub-graph may be stored separately from graph 120 in offline graph database 314.

At operation 1006, graph logs update the graph and the sub-graph. For example, when offline component 304 receives graph logs 322 from events 320, the data and operations in graph logs 322 may update both graph 120 and the subgraph.

At operation 1008, graph and the sub-graph are combined into a result. For example, offline graph engine 316 may combine graph 120 and the sub-graph into a single snapshot or a result. Offline graph engine 316 may use the result to test changes to graph schema 102 and changes to graph 120 that result in changes to the graph schema 102.

Figure 11:
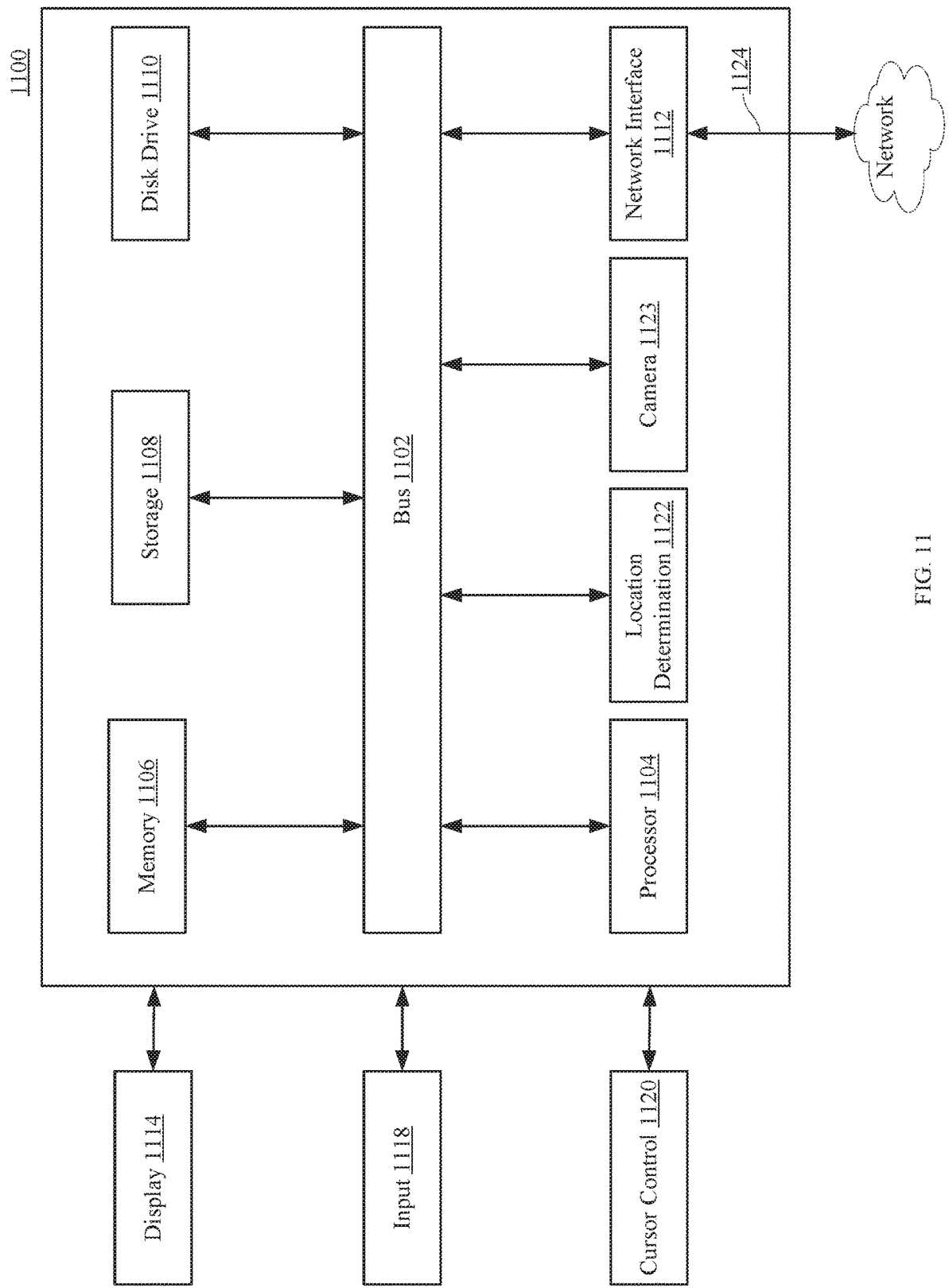
FIG. 11 is a block diagram of a computer system suitable for implementing one or more components or operations in FIGS. 1-10 according to an embodiment.

Referring now to FIG. 11 an embodiment of a computer system 1100 suitable for implementing, the systems and methods described in FIGS. 1-10 is illustrated.

In accordance with various embodiments of the disclosure, computer system 1100, such as a computer and/or a server, includes a bus 1102 or other communication mechanism for communicating information, which interconnects subsystems and components, such as a processing component 1104 (e.g., processor, micro-controller, digital signal processor (DSP), graphics processing unit (GPU), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may comprise a database having one or more disk drive components.

In accordance with embodiments of the disclosure, the computer system 1100 performs specific operations by the processor 1104 executing one or more sequences of instructions contained in the memory component 1106, such as described herein with respect to the mobile communications devices, mobile devices, and/or servers. Such instructions may be read into the system memory component 1106 from another computer readable medium, such as the static storage component 1108 or the disk drive component 1110. In other embodiments, hard-wired circuitry may be used in place of or in combination with software instructions to implement the disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1100. In various other embodiments of the disclosure, a plurality of the computer systems 1100 coupled by a communication link 1124 (e.g., such as a LAN, WLAN, PTSN, and/or various other wired or wireless networks, including telecommunications, mobile, and cellular phone networks) may perform instruction sequences to practice the disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
receiving, at a graph database system that includes a first graph in a real-time graph database included in an online component and a second graph in an offline graph database included in an offline component, at least one event that modifies the first graph, wherein the first graph and the second graph are based on a graph schema;
generating graph logs that include changes to the first graph in the real-time graph database caused by at least one transaction in the at least one event, wherein the changes include mutations to one or more vertices in a plurality of vertices in the first graph and to one or more edges in a plurality of edges in the first graph;
transmitting the graph logs to the offline component in a chronological order;
modifying the second graph in the offline graph database using the graph logs;
generating snapshots of the second graph at configurable time intervals;
determining that the first graph includes corrupted data in at least one vertex in the plurality of vertices at a first point in time;
identifying the snapshot from the snapshots of the second graph that was generated at a second point in time prior to the first point in time;
replaying a subset of graph logs from the graph logs on the snapshot from the snapshots, wherein the subset of graph logs from the graph logs is from the second point in time to the first point in time;
validating data in the second graph based on data generated using the subset of graph logs and the snapshot during the replaying;
transmitting the snapshot and the subset of graph logs from the offline component to the online component in the chronological order;
updating the first graph with the snapshot and the subset of graph logs used to validate the data in the second graph; and
recovering the first graph based on the updating.

2. The method of claim 1, wherein the plurality of vertices are connected by the plurality of edges, a vertex in the plurality of vertices including metadata, a vertex identifier and at least one vertex property and an edge in the plurality of edges including a relationship between at least two vertices in the plurality of vertices, edge metadata, and at least one edge property.

3. The method of claim 2, wherein a change in the changes is to the at least one vertex property in the vertex or to the at least one edge property in the edge.

4. The method of claim 1, further comprising:
dividing the first graph into a first cluster and a second cluster, wherein dividing the first graph further comprises:
applying a hash function to the plurality of vertices;
generating a result based on the applying; and
including first vertices from the plurality of vertices in the first cluster when the result is a first result; or
including second vertices from the plurality of vertices in the second cluster when the result is a second result.

5. The method of claim 1, wherein a vertex in the plurality of vertices in the first graph includes a vertex identifier that uniquely identifies the vertex from other vertices in the plurality of vertices.

6. The method of claim 1, further comprising:
determining second corrupted data in the first graph; and
recovering data in the first graph using a second snapshot from the snapshots that was generated prior to a point in time that the corrupted data was determined and a graph log in the graph logs.

7. The method of claim 1, further comprising:
determining a value in a vertex of the snapshot;
generating a graph log that includes the value and an operation that inserts the value into the first graph; and
updating the first graph with the value using the graph log.

8. The method of claim 1, further comprising:
determining that the first graph includes second corrupted data in a second vertex in the plurality of vertices;
instantiating a new version of the first graph;
transmitting the graph logs from the offline component to the online component in the chronological order;
inserting data in the graph logs into the new version of the first graph using operations in the graph logs; and
recovering the first graph based on the inserting.

9. The method of claim 1,
wherein the method further comprises:
retrieving a vertex property of a vertex in the second graph at the first point in time; and
validating the vertex property.

10. A system comprising:
at least one memory configured to store a graph database system comprising a first graph in a real-time graph database included in an online component and a second graph in an offline graph database included in an offline component, wherein the first graph and the second graph are based on a graph schema; and
a processor coupled to the at least one memory and configured to perform operations that cause the graph database system to:
receive at least one event that modifies the first graph;
generate graph logs that include changes to the first graph in the real-time graph database caused by at least one transaction in the at least one event, wherein the changes include mutations to one or more vertices in a plurality of vertices in the first graph and to one or more edges in a plurality of edges in the first graph;
transmit the graph logs to the offline component in a chronological order;
modify the second graph in the offline graph database using the graph logs;
generate snapshots of the second graph at configurable time intervals;
determine that the first graph includes corrupted data in at least one vertex in the plurality of vertices at a first point in time;

identify a snapshot from the snapshots of the second graph that was generated at a second point in time prior to the first point in time;

replay a subset of graph logs from the graph logs on the snapshot from the snapshots, wherein the subset of graph logs from the graph logs is from the second point in time to the first point in time;

validate data in the second graph based on data generated using the subset of graph logs and the snapshot during the replaying;

transmit the snapshot and the subset of graph logs from the offline component to the online component in the chronological order;

update the first graph with the snapshot and the subset of graph logs used to validate the data in the second graph; and recover the first graph based on the updating.

11. The system of claim 10, wherein the plurality of vertices are connected by the plurality of edges, a vertex in the plurality of vertices including metadata, a vertex identifier and at least one vertex property and an edge in the plurality of edges including a relationship between at least two vertices in the plurality of vertices, edge metadata, and at least one edge property.

12. The system of claim 11, wherein a change in the changes is to the at least one vertex property in the vertex or to the at least one edge property in the edge.

13. The system of claim 10, wherein the processor is further configured to perform operations that cause the graph database system to divide the first graph into a first cluster and a second cluster by:

applying a hash function to the plurality of vertices;
generating a result based on the applying; and
including first vertices from the plurality of vertices in the first cluster when the result is a first result; or
including second vertices from the plurality of vertices in the second cluster when the result is a second result.

14. The system of claim 10, wherein a vertex in the plurality of vertices in the first graph includes a vertex identifier that uniquely identifies the vertex from other vertices in the plurality of vertices.

15. The system of claim 10, wherein the processor is further configured to perform operations that cause the graph database system to:

determine second corrupted data in the first graph; and
recover data in the first graph using a second snapshot from the snapshots that was generated prior to a point in time that the corrupted data was determined and a graph log in the graph logs.

16. The system of claim 10, wherein the processor is further configured to perform operations that cause the graph database system to:

determine a value in a vertex of the snapshot;
generate a graph log that includes the value and an operation that inserts the value into the first graph; and
update the first graph with the value using the graph log.

17. The system of claim 10, wherein the processor is further configured to perform operations that cause the graph database system to:

determine that the first graph includes second corrupted data in a second vertex in the plurality of vertices;
instantiate a new version of the first graph;
transmit the graph logs from the offline component to the online component in the chronological order;
insert data in the graph logs into the new version of the first graph; and
recover the first graph based on the inserting.

18. A method, comprising:

receiving, at a graph database system that includes a first graph in a real-time graph database included in an online component and a second graph in an offline graph database included in an offline component, at least one event that modifies the first graph, wherein the first graph and the second graph are based on a graph schema;

generating graph logs that include changes to the first graph in the real-time graph database caused by at least one transaction in the at least one event, wherein the changes include mutations to one or more vertices in a plurality of vertices in the first graph and to one or more edges in a plurality of edges in the first graph;

transmitting the graph logs to the offline component in a chronological order;

modifying the second graph in the offline graph database using the graph logs;

generating snapshots of the second graph at configurable time intervals;

replaying a subset of graph logs from the graph logs on a snapshot from the snapshots;

validating data in the second graph based on data generated using the subset of graph logs and the snapshot during the replaying;

determining that the first graph includes corrupted data in at least one vertex in the plurality of vertices;

instantiating a new version of the first graph;

transmitting the graph logs from the offline component to the online component in the chronological order;

inserting data in the graph logs into the new version of the first graph using operations in the graph logs; and recovering the first graph based on the inserting.

19. The method of claim 18, wherein the plurality of vertices are connected by the plurality of edges, a vertex in the plurality of vertices including metadata, a vertex identifier and at least one vertex property and an edge in the plurality of edges including a relationship between at least two vertices in the plurality of vertices, edge metadata, and at least one edge property.

20. The method of claim 19, wherein a change in the changes is to the at least one vertex property in the vertex or to the at least one edge property in the edge.

* * * * *